(No Model.)
C. R. C. TICHBORNE, A. E. DARLEY, M. F. PURCELL & S. GEOGHEGAN.
METHOD OF AND APPLIANCE FOR THE COLLECTION AND UTILIZATION OF CARBONIC ACID GAS AND OTHER PRODUCTS GIVEN OFF DURING THE PROCESS OF FERMENTATION.
No. 472,085. Patented Apr. 5, 1892.
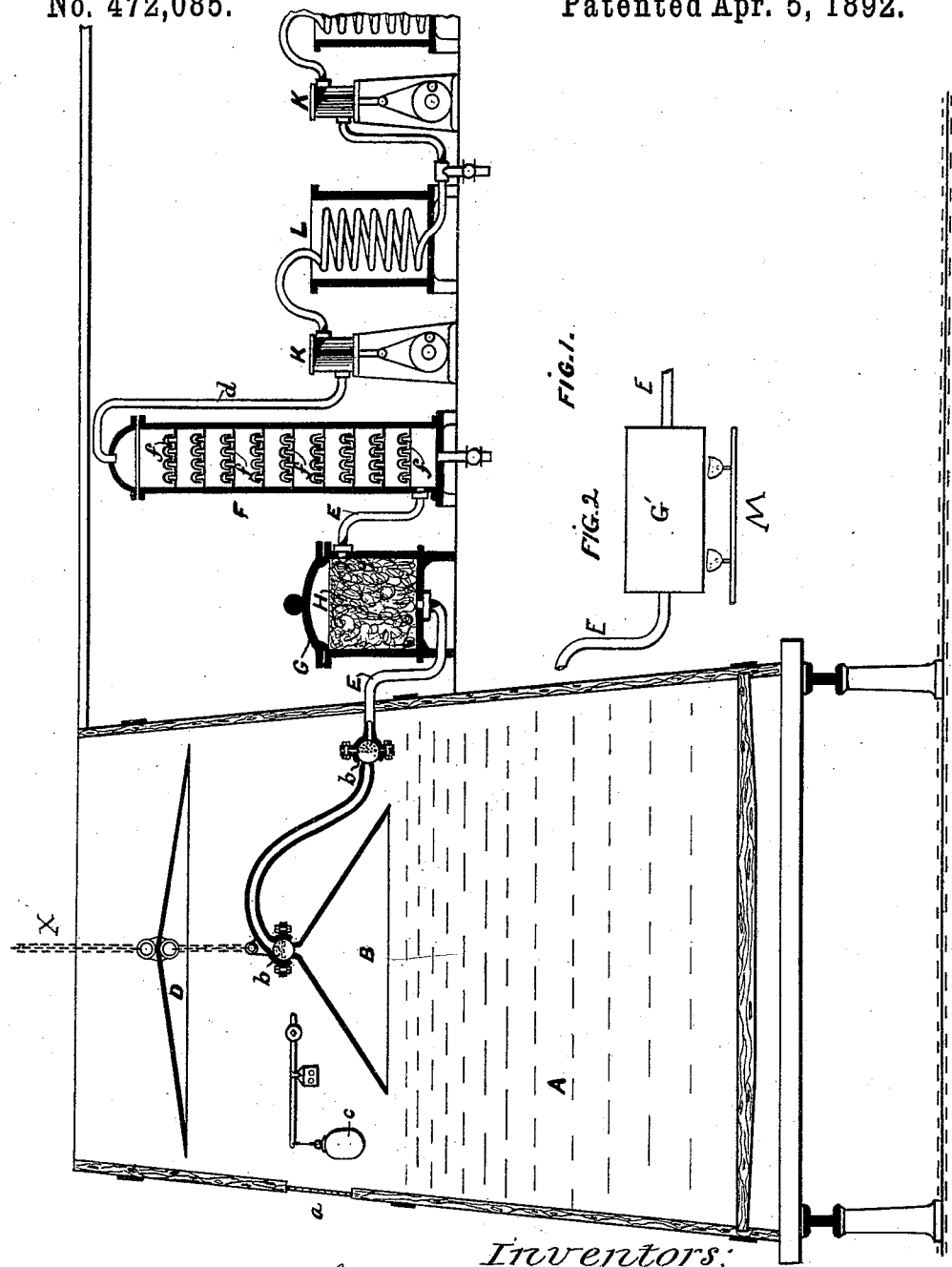

UNITED STATES PATENT OFFICE.

CHARLES R. C. TICHBORNE, ALFRED EDWARD DARLEY, MARMADUKE FRANCIS PURCELL, AND SAMUEL GEOGHEGAN, OF DUBLIN, IRELAND, ASSIGNORS TO THE BREWERS AND DISTILLERS $CO_2$ COMPANY, LIMITED, OF WESTMINSTER, ENGLAND.

METHOD OF AND APPLIANCE FOR THE COLLECTION AND UTILIZATION OF CARBONIC-ACID GAS AND OTHER PRODUCTS GIVEN OFF DURING THE PROCESS OF FERMENTATION.

SPECIFICATION forming part of Letters Patent No. 472,085, dated April 5, 1892.

Application filed February 4, 1891. Serial No. 380,252. (No model.)

*To all whom it may concern:*

Be it known that we, CHARLES ROBERT CLARKE TICHBORNE, ALFRED EDWARD DARLEY, brewer, MARMADUKE FRANCIS PURCELL, and SAMUEL GEOGHEGAN, engineer, have invented a Method of and Appliances for the Collection and Utilization of the Carbonic-Acid Gas and other Products Given Off During the Process of Fermentation, of which the following is a specification.

Our invention relates to improvements in the method or process of and appliances for collecting and utilizing the carbonic-acid gas and other gaseous products which are generated during the action of all fermentation, as previously applied for in the United States by the present applicants under Serial No. 334,470.

We find it to be of importance in carrying out our process to employ an ordinary brewer's fermentation-tun without closing the same by a special cover; but at the same time we provide special arrangements to avoid the admixture with the desired gaseous products of fermentation of atmospheric air and thereafter use special treatment to effect the removal of yeast or germs from the products of fermentation, and finally to separate free oxygen or alcoholic and ethereal vapors from the said gaseous products of fermentation, so as to obtain a liquefied product of pure $CO_2$ suitable for use in the arts and manufactures.

Figure 1 is a general sectional elevation of the apparatus or appliances we find it convenient to use for carrying out our improved process, the main parts of which are included in our former said United States application, Serial No. 334,470, but parts of which are added and modified herein to suit the special process hereinafter described. Fig. 2 is a view of an apparatus for heating the gases.

To the ordinary or open fermentation-tun A we apply the following collecting devices, which, while preventing the admixture of atmospheric air with the gaseous products of fermentation during collection, permits the latter to be carried on in an open tun, and thus always under atmospheric pressure. This collecting apparatus consists of a bell or funnel B, supported adjustably by a ball-and-socket joint $b$ or other equivalent means, just above the surface of the fermenting worts and extending over a considerable surface of the said worts, so as to collect the gaseous products of fermentation and particularly the $CO_2$, where it accumulates close to the surface of said worts. Over this bell or funnel B is suspended a diaphragm D, extending almost to the walls of the fermenting-tun, so as to prevent any whirlpool or downward current being formed in the upper atmosphere of the tun during the withdrawal of the gases of fermentation through the said funnel B. The bell of this funnel is provided with an aperture at the top of the cone, communicating through the supporting-standard $b$ to the pipe E, by which the collected gases are carried through the filter G to a wash tower or towers F for further special treatment, hereinafter described.

In order to indicate a proper position for the said collecting-bell B—that is, to indicate the height of the heavy gaseous layer of $CO_2$ within the tun—a small balloon C, filled with air and constructed of gold-beater's skin or other suitable light material, is attached to a balance-lever and is floated on the surface of the carbonic acid and rises and falls with the level of the gas.

$a$ is a glass plate inserted in the wall of the vat or tun A, through which the position of the float $c$ can be observed.

In order to free the said $CO_2$ from all yeast or other germs before using it, we pass the gas through a filter G, containing cotton-wool H or other filtering medium, or equivalently through a chamber or pipe, such as G', (shown in Fig. 2,) heated to the requisite temperature necessary to devitalize any germs that may be in the gas. This devitalization may be effected before the gas passes to a wash tower or towers F, as illustrated, or at a later stage in the process, as may be found most convenient in working. Any antiseptic commonly employed for such purposes, as salicylic acid, if desired, may be mixed eventually with the liquefied or solidified $CO_2$.

It is found that a percentage of oxygen is freqently mixed with the carbonic-acid gas and that a small percentage accompanying the $CO_2$ materially interferes with the after compression and liquefaction of the said $CO_2$. To remove this oxygen, we place some easily-oxidizable substance in a tower, such as a solution of ferrous sulphate.

To effect thorough washing of the rising gases, we arrange in the tower a series of trays $f$, provided with vertical tubes protecting the orifices in the trays, the washing-liquid being placed to a suitable depth in the bottom of the trays. Over each of the said tubes is suspended a cap, dipping with its lower edge into the washing-liquid, so that the gas passing through the tubes is forced to return and pass through the washing-liquid. This water will rapidly remove the free oxygen present and the serious difficulty experienced in the compression of the $CO_2$ will be eliminated. Further, to remove all alcoholic or ethereal vapors with which the $CO_2$ may be charged or be in combination, we pass a spray of sulphuric acid through a tower or apply a series of perforated trays, as hereinbefore described, carrying sulphuric acid to wash the passing vapors of fermentation and to remove all odorous gases, producing liquid sulpho-vinic acid, as a deposit in the trays or tower, which may be thence readily removed. The $CO_2$, thus purified and separated from other accompanying gaseous bodies, may be drawn off from the tower by the pipe $d$ by the suction action of a series of stage compressing-pumps K K, and be therein compressed and refrigerated in the condensing-coils L L as a pure commercial product to be bottled in suitable vessels for commercial sale, as described in our aforesaid previous application.

What we do claim, and desire to secure by Letters Patent, is—

1. An improved process consisting in collecting gaseous products of fermentation from an open fermentation-vat having a diaphragm, by means of which atmospheric air is excluded from the gases during their withdrawal, treating the said gaseous products with an easily oxidizable substance, removing germs or yeast from the said gaseous products by filtration and by heat, separating alcoholic or ethereal odorous vapors by washing with sulphuric acid, and finally compressing, step by step, the purified carbonic-acid gas to liquefaction.

2. The process of purifying gaseous products of fermentation, which consists in removing therefrom yeast or vital germs by filtration through cotton-wool, condensing and further purifying the gas by admixture of antiseptic substance when the gas is in a liquid or solid condition, substantially as set forth.

3. The process of purifying gaseous products of fermentation, which consists in separating therefrom alcoholic or ethereal odorous vapors by washing with sulphuric acid to form sulpho-vinic acid.

4. In the apparatus for the collection of gaseous substances arising from fermentation, the combination, with the fermenting tun or vat A, of the chain X, the inverted funnel or bell B, adapted to be suspended close to the surface of the fermenting liquors by means of said adjustable chain, the protecting diaphragm D, suspended in the upper part of the tun A by the chain X and adapted to prevent the admixture of the atmospheric air with the gases of fermentation during their withdrawal, substantially as set forth.

In testimony whereof we have signed our names to this specification in the presence of two subscribing witnesses.

CHARLES R. C. TICHBORNE.
ALFRED EDWARD DARLEY.
MARMADUKE FRANCIS PURCELL.
SAMUEL GEOGHEGAN.

Witnesses to the signatures of Charles R. C. Tichborne and Alfred E. Darley:
ROBT. H. BEAUCHAMP,
*Notary Public, Dublin.*
JONAS A. ROONEY,
117 *North Strand Road, Dublin, Law Clerk.*

Witnesses to the signatures of M. F. Purcell and S. Geoghegan:
REGINALD WILLIAM JAMES,
*Civil Engineer.*
RICHARD A. HOFFMANN.